Jan. 20, 1953  J. McEWAN  2,625,842
SAW SHARPENER
Filed Nov. 14, 1949  2 SHEETS—SHEET 1
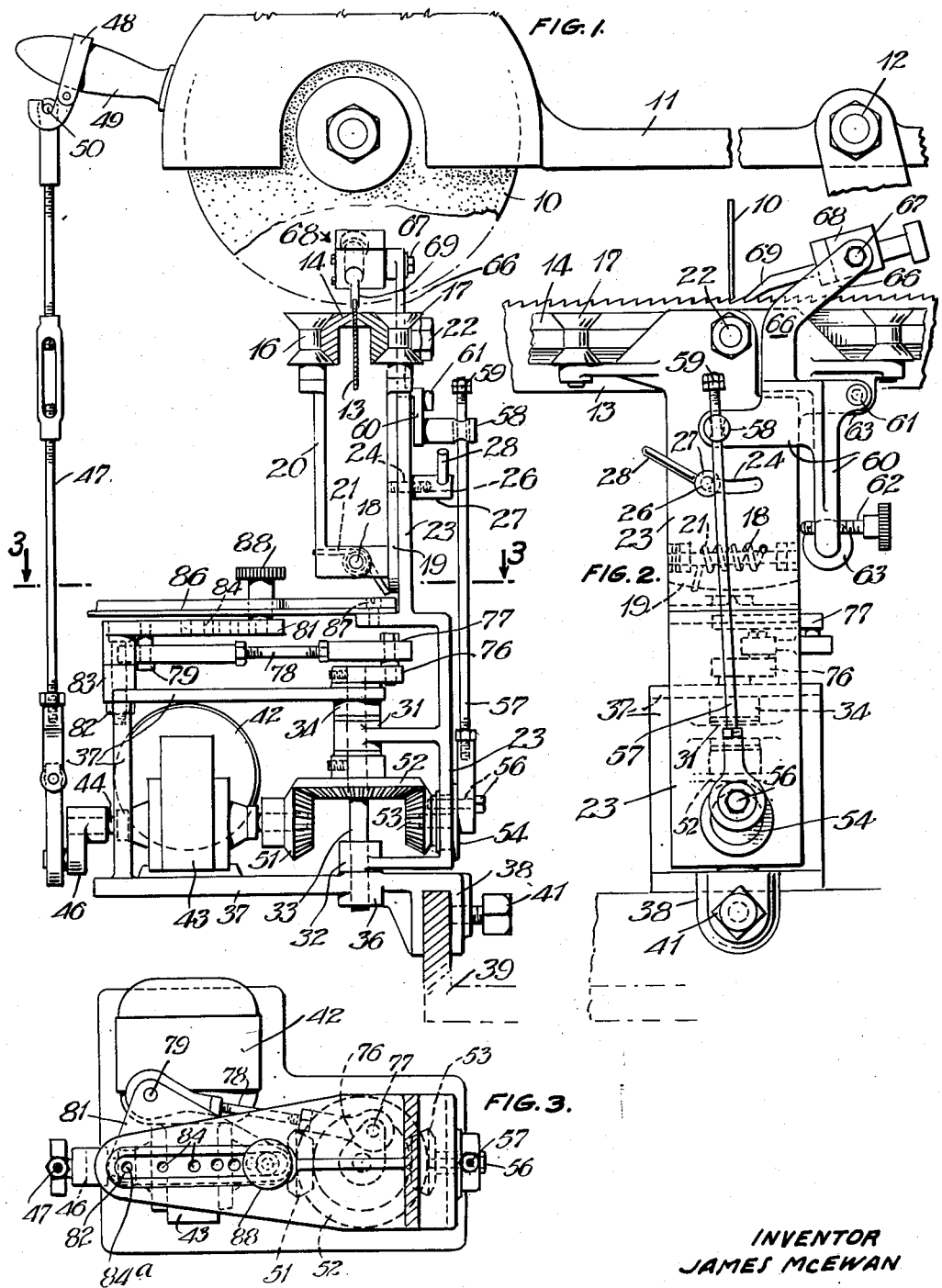
INVENTOR
JAMES McEWAN
BY Harper Allen
ATTORNEY Jan. 20, 1953  J. McEWAN  2,625,842
SAW SHARPENER
Filed Nov. 14, 1949  2 SHEETS—SHEET 2
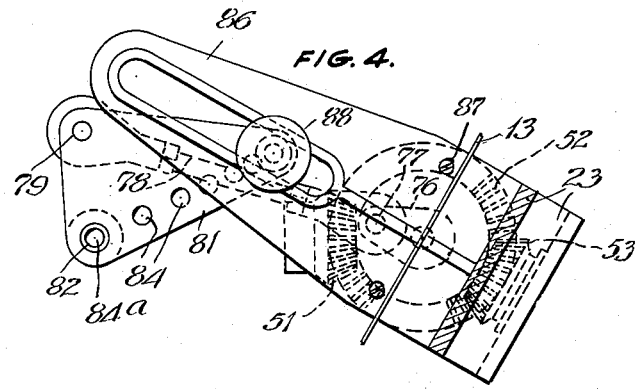
INVENTOR
JAMES McEWAN
BY Harper Allen
ATTORNEY Patented Jan. 20, 1953

2,625,842

UNITED STATES PATENT OFFICE 2,625,842

SAW SHARPENER

James McEwan, San Jose, Calif.

Application November 14, 1949, Serial No. 127,017

3 Claims. (Cl. 76—40)

The present invention relates to saw sharpeners and is concerned more particularly with an improved sharpening device in which the saw, such as a hand saw, a hack saw, or a band saw, is automatically fed and positioned with reference to a sharpening element such as a grinding wheel.

The invention has for its objects, among others, the provision of a saw sharpening device in which an automatic control of the in-and-out feed of a sharpening element is effected in timed relation to a tooth-by-tooth feed of the saw and to an angular adjustment of the saw with respect to the sharpening element. Alternate teeth are positioned at oppositely angled relation so that the desired sharpening operation is performed with reference to each tooth with a desired angularity of cut with respect thereto. The sharpener is provided with easily effected adjustments for the depth of feed of the sharpening element with respect to the tooth of a saw, for varying the step-by-step feed, and for adjustment of the desired angularity of the tooth of the saw with respect to the sharpening element.

The above and other objects of the invention from the following description of a preferred embodiment, as illustrated in the accompanying drawings, in which:

Figure 1 is a side elevational view of the sharpening device.

Figure 2 is a fragmentary elevational view looking from the right of Figure 1.

Figure 3 is a fragmentary sectional plan view taken as indicated by the line 3—3 in Figure 1 with certain parts omitted to clarify the view.

Figure 4 is a fragmentary plan view illustrating the angular adjustment of the saw.

Figure 5 is a view similar to Figure 4 showing the opposite angularity of the adjusted position of the saw at the time the grinding cut is made.

Figure 6 is a view showing the angular adjustment means set to inactive position.

Figure 7 is an exploded perspective view illustrating the related parts for effecting and controlling the angular adjustment of the saw with respect to the sharpening element.

The present invention is illustrated as applied to a saw sharpener of the type disclosed and claimed in my co-pending application, Serial No. 779,001, filed October 10, 1947, now Pat. No. 2,590,992, for Saw Sharpener, and reference is made to the above described application for details of the saw sharpener as a whole which are not disclosed herein. Referring to Figures 1 and 2, the saw sharpener includes a grinding wheel 10 carried by a bracket 11 pivotally and movably supported at 12 for linear in-and-out movement with respect to a saw 13 as disclosed in said co-pending application. The saw 13 is frictionally clamped in a split saw holder 14 of conventional construction which is guided by respective opposite sets of support end guide rollers 16 and 17. The guide rollers 16 are journalled on a support bracket 20 which is pivotally mounted at 18 on the opposite support bracket 19 of the saw holder. A suitable torsion spring 21 is provided in conjunction with the pivot 18 and the bracket 20 to yieldably hold the saw holder 14 between the rollers 16 and 17. The opposite bracket 19 of the saw holder is pivotally supported at 22 on a vertical supporting bracket 23, which is slotted arcuately at 24 to receive a stud 26. A clamping nut 27 having a handle 28 is provided on the stud 26. In this manner, the saw holders or brackets 19 and 20 can be angularly adjusted to position the face of a saw tooth to the desired rake with respect to the grinding wheel 10.

The vertically extending support bracket 23 forms the oscillating or angular adjustment member or support and for this purpose is provided with vertically spaced apart bosses 31 and 32 which pivotally engage about an upright shaft 33 whose axis is in alignment with the point of engagement of the sharpening element 10 with the tooth of a saw. The shaft 33 is journalled in respective bearings 34 and 36 in a generally rectangular base or frame piece 37 which adjacent its lower end is provided with a grooved flange 38 for clamping on a supporting frame member 39 of the saw sharpener by means of a clamping screw 41.

As previously explained the various operating elements of the saw sharpener are driven in timed relation to each other to effect the sharpening of the saw and to effect the feed of the saw and its adjustment with respect to the sharpening element. For this purpose, a motor 42 of conventional construction is mounted on the frame member 37 and the gear head 43 of the motor is provided with a drive shaft 44 extending to either side thereof. At the left side of the drive shaft 44, as viewed in Figure 1, the shaft 44 carries a crank arm 46 which is pivotally connected to an adjustable turnbuckle link 47. At its upper end, the link 47 has a pin 50 pivotally engaged with a clamp 48 secured to the handle 49 of the sharpener supporting bracket 11. As a result, the wheel 10 is moved in and out with respect to the saw 13 in the holder 14 once for each revolution of the shaft 44. As seen in Figure 1, the sharpening element is in its active position in engagement with a tooth of the saw.

The opposite or right hand end of the shaft 44 carries a bevel pinion 51 which is engaged with a bevel gear 52 on the shaft 33. The gear 52 engages in turn a second bevel pinion 53 journalled by its support shaft in the bracket 23. An enlarged end or crank portion 54 of the shaft 53 is suitably journalled in the bracket 23 and carries a crank pin 56 engaged with a drive link 57 which extends upwardly and passes through an apertured stud 58. The upper end of the link 57 is threaded to receive a drive nut 59 and a suitable lock nut therefor which provide lost motion in the drive from the link 57 to the pin 58. The pin 58 is carried by a pawl supporting bracket 60 which is pivoted at 61 on an extension 63 of the bracket 23 and at its lower end carries a stop screw 62 which can be locked in its selected adjusted position by means of a clamp 65. The pawl bracket 60 carries an upstanding arm 66 which has pivotally mounted thereon at 67 an adjustable feed pawl assembly 68 having a feed pawl 69, this assembly being of a construction disclosed and claimed in my co-pending application Serial No. 129,459, filed November 25, 1949, now Patent No. 2,607,243.

It will be noted that the lost motion in the drive to the pawl 69, i. e., the space between the drive nut 69 and the pin 58 provides additional time for the sharpening element or grinding wheel 10 to advance into and withdraw from the tooth between feeding movements of the pawl 69.

As previously stated the sharpener also includes means for selectively effecting an angular adjustment of the saw with respect to the sharpening element. It will be recalled that the bracket 23 is mounted for oscillatory movement about the shaft 33 and this movement is controlled by means including a crank arm 76 on the shaft 33 and connected by a pin 77 to drive a connecting link 78. The opposite end of the link 78 is pivoted at 79 (Figure 3) to one arm of a bellcrank member 81 which has its pivot stud 82 mounted in a boss 83 of the frame member 37. The bellcrank member 81 has a series of threaded apertures 84 extending at spaced distances from its point of pivotal support 82 with one of such apertures 84a provided in the recessed head of the stud 82. Spaced horizontally above the bellcrank member 81 is a slotted connecting member or arm 86 secured at 87 to the bracket 23. The member 86 receives a clamping nut 88 whose lower end can be threadably engaged with any selected aperture 84 or 84a to provide a pivotal connection between the bellcrank 81 and the connecting arm 86.

From the above description, it will be apparent that the bellcrank 81 receives a constant oscillatory movement from the drive and that a selected amount of this oscillatory movement can be transmitted through the connecting arm 86 and the pivot connection 88 to the saw supporting bracket 23 in accordance with which of the apertures 84 is selected for installation of the pivotal connecting member 88. If the member 88 is connected to the threaded aperture or station 84a as illustrated in Figure 6 the oscillatory movement of the bellcrank member 81 is without effect on the connecting arm 86 and the saw supporting bracket 23. Correspondingly if the connecting member 88 is positioned in the rightmost aperture 84 as viewed in Figures 4 and 5, the saw support bracket 23 will receive a maximum angular adjustment with respect to the saw sharpening element. The respective positions of the saw 13 as indicated in Figures 4 and 5 show the opposite angular adjustments of the saw with respect to the sharpening element 10.

While the angular oscillation of the saw support bracket 23 and the saw 13 with respect to the sharpening element 10 is continuous the motion is in its slow phase at the time the element 10 engages the tooth of the saw so that substantially the desired angle of cut across the face of the tooth will be obtained and no substantial effect on the face of the tooth is present by virtue of the travel of the bracket 23. Also it will be noted that the drive of the crank arm 76 and correspondingly the oscillation of the saw with respect to the grinding wheel 10 is at a rate of ½ of that of the movements of the saw sharpening element 10 and feed wall 69 so that it is timed to effect the adjustment for alternate teeth of the saw rather than for each tooth of the saw as is the case with the grinding wheel 10 and the pawl 69.

In operation, the saw, either a hand saw, a hack saw, or a band saw, is placed in the split holder 14 and secured in place in the saw sharpener as shown in Figure 1 and the first tooth to be ground is adjusted carefully with respect to the grinding wheel 10 so that the desired cut will be made thereon. Subsequently, with the machine in operation, the teeth are advanced one by one into sharpening position by the pawl 69 and are ground at the desired rake and angularity by the grinding wheel 10.

If an angular adjustment of the saw is determined by the positioning of the connecting pivot member 88, each alternate tooth in accordance with its set is ground at the desired angularity by virtue of the angular adjustment of the saw supporting bracket 23 as previously described. The retracted position of the feed pawl 69 is determined in accordance with the tooth spacing of the saw by setting the stop screw 62, while the desired feed can be effected by the adjustment of the drive nut 59 to vary its lost motion connection with respect to the apertured stud 58. Also by adjustment of the connecting link 47 the extent of the depth of the cut of the grinding wheel 10 can be set.

While I have shown a preferred embodiment of the invention it will be understood that the invention is capable of variation and modification from the form shown so that its scope should be limited only by the scope of the claims appended hereto.

I claim:

1. In a saw sharpener having a sharpening element and a saw support, means mounting said suport for angular adjustment of said saw support to place the face of a saw tooth in a desired plane of adjustment with respect to the sharpening element, and means for moving said mounting means including a drive bellcrank having a pivotal mounting and a series of connecting stations including one in alignment with said pivotal mounting, a driven arm carried by said mounting means and extending along said bellcrank, and a connecting element for pivotal mounting in said arm and for connection to any selected one of said connecting stations.

2. In a saw sharpener having a sharpening element and a saw support, means mounting said support for angular adjustment to place the face of a saw tooth in a desired plane of adjustment with respect to the sharpening element; and means for moving said mounting means including a drive bell crank having a pivotal mounting, one arm of said bell crank being connected to driving mechanism, the other arm having a series of connecting stations, a driven arm connected to said mounting means and extending adjacent said other arm of said bell crank, and a connecting element for connecting said driven arm to any selected one of said connecting stations.

3. In a saw sharpener having a sharpening element and a saw support, means mounting said support for angular adjustment to place the face of a saw tooth in a desired plane of adjustment with respect to the sharpening element; and means for moving said mounting means including a drive bell crank having a pivotal mounting, one arm of said bell crank being connected to driving mechanism, the other arm having a series of connecting stations, a driven arm connected to said mounting means and having an elongated slot therein, said driven arm extending adjacent said other arm of said bell crank, and a connecting element extending through said slot and connected to a selected one of said connecting stations.

JAMES McEWAN.

REFERENCES CITED

The following references are of record in the file of this patent:

UNITED STATES PATENTS

| Number | Name | Date |
|---|---|---|
| 226,291 | Dudley | Apr. 6, 1880 |
| 675,780 | Lucas | June 4, 1901 |
| 1,567,749 | Pritchard | Dec. 29, 1925 |
| 1,666,087 | Collier | Apr. 17, 1928 |
| 1,832,224 | Klunk | Nov. 17, 1931 |
| 1,853,245 | Wardell, Jr. | Apr. 12, 1932 |
| 2,319,437 | Biasotti | May 18, 1943 |
| 2,429,300 | Wilbert | Oct. 21, 1947 |
| 2,483,336 | Deyarmond | Sept. 27, 1949 |